Sept. 18, 1962 R. FRIEDRICHS 3,054,293
THERMOMETER EMPLOYING MAGNETIC INDICATING MEANS
Filed July 27, 1960 2 Sheets-Sheet 2

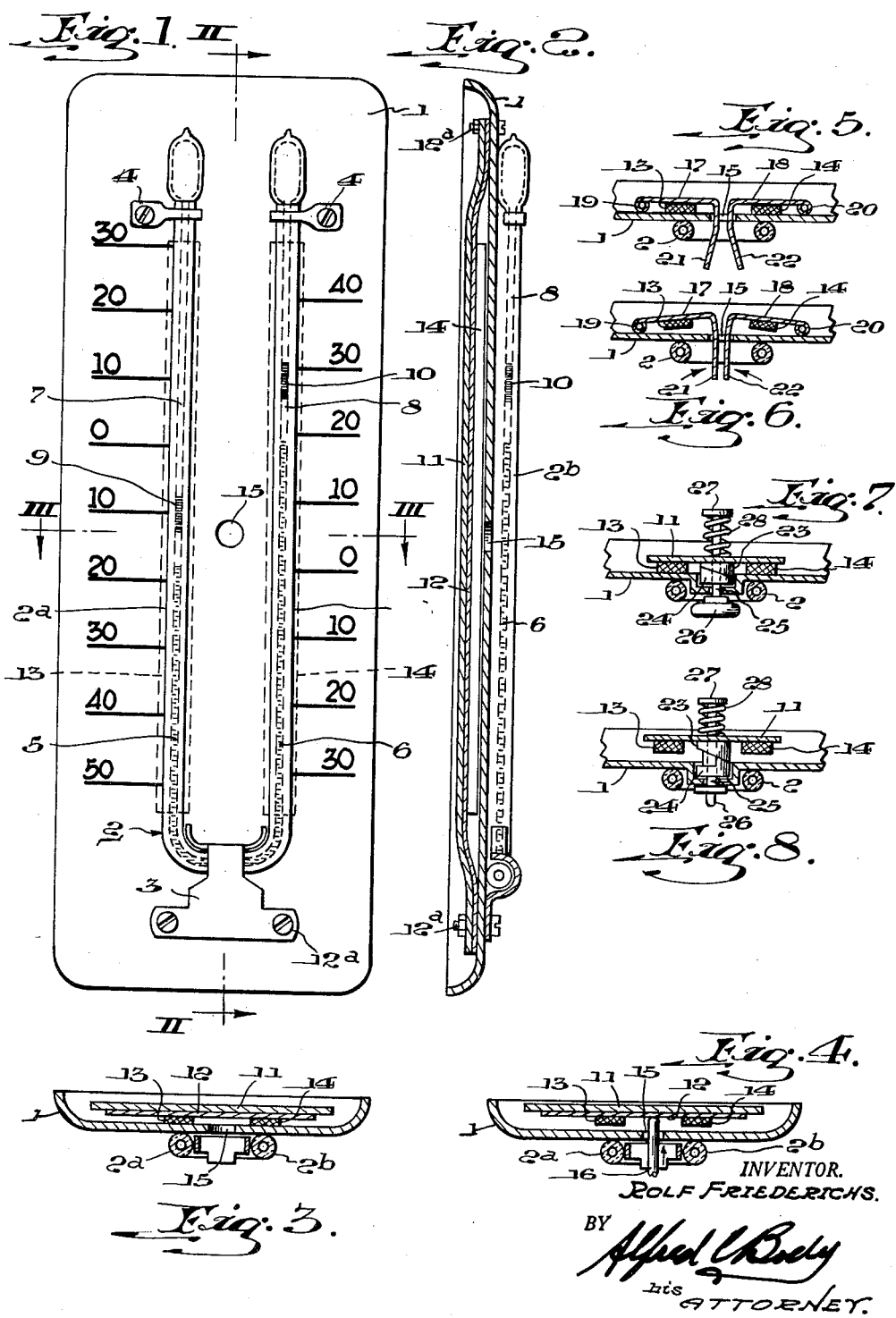

INVENTOR.
ROLF FRIEDRICHS.
BY
ATTORNEY.

United States Patent Office 3,054,293
Patented Sept. 18, 1962

3,054,293
THERMOMETER EMPLOYING MAGNETIC
INDICATING MEANS
Rolf Friedrichs, Koln-Zollstock, Germany
Filed July 27, 1960, Ser. No. 45,611
Claims priority, application Germany July 29, 1959
12 Claims. (Cl. 73—371)

This invention relates, in general, to temperature measuring thermometers, and more particularly to a maximum-minimum thermometer utilizing permanent magnetic materials to hold ferromagnetic indicating elements, positioned above columns of mercury, in their maximum and minimum temperature positions.

Although not limited thereto, the present invention is particularly adapted for use in a maximum-minimum thermometer of the type employing a U-shaped transparent tube which is filled, at its lower portion, with unbalanced columns of mercury. Above the mercury columns on either side of the U-shaped tube is a liquid having a large coefficient of expansion, such as alcohol. In this manner, the mercury will expand and rise in the side of the tube having the greater column of mercury in response to a rise in temperature. When the temperature falls, however, the alcohol or other similar liquid, having a higher coefficient of expansion than the mercury, will contract, thereby allowing the mercury to move upwardly in the other side of the tube having the lesser column of mercury therein. Thus, the maximum temperature is indicated by the maximum rise of the mercury in one column while the minimum temperature is indicated by the maximum rise of the mercury in the other column. As the respective mercury columns rise, they elevate iron pins which are held in their uppermost positions to indicate the maximum and minimum temperatures achieved, for example, over a twenty-four hour period.

In prior art thermometers of this type, both legs of the U-shaped tube are equipped with a friction brake which usually comprises a glass fiber welded onto, and protruding into, the interior of the tube. With this arrangement, the iron indexes or pins remain at the furthest positions to which they are forced by the mercury columns, thus indicating the maximum and minimum temperatures during a day. After the limit temperatures have been read, it has heretofore been necessary to use a permanent magnet to bring the indexes back into contact with the tops of the mercury columns. Usually this magnet was of the horseshoe type with pole ends ground to correspond to the curve of the glass tube whereby the magnet could be set on the glass tube and moved downwardly toward the mercury columns, thereby carrying the pins of ferromagnetic material along with it. As will be understood, this operation is somewhat complicated and depends upon the availability of a bipolar steel magnet or some other suitable permanent magnet. In addition, since maximum-minimum thermometers are usually mounted outside and are subject to the effects of weather, in time rust attacks the magnets inasmuch as they are mounted close to the thermometer.

It is a primary object of this invention to provide new and improved means for indicating the maximum rise of a column of mercury or other expansible liquid in a thermometer column which overcomes the disadvantages of previous indicating devices.

More particularly, an object of the invention is to provide a new and improved means for holding an indicator in position to indicate the maximum rise of mercury columns in a maximum-minimum thermometer.

In accordance with the present invention, the indicating elements or pins are formed from magnetically permeable material but are substantially frictionlessly movable within the thermometer tube above the column of mercury or other similar expansible liquid and a permanent magnet device is positioned close to the thermometer tube to hold the pins in any position to which they are moved by the mercury but may be selectively moved away therefrom to release the pin. With this arrangement, when the permanent magnet device is closely adjacent the thermometer tube, the indicating element or pin is drawn into frictional engagement with the walls of the tube and is held in the uppermost position to which it was pushed by the expansion of the mercury column. When, however, the magnetic device is moved away from the thermometer tube, the indicating element will no longer be under the influence of the magnetic field and will drop freely by its own weight onto the top of the mercury column. With this arrangement, the permanent magnet can be built into a protected position within the thermometer and no longer represents a separate element which can be easily mislaid or damaged due to exposure to the elements.

The permanent magnet referred to above is preferably, although not necessarily, of the flexible or rubber magnet type which may be mounted flexibly behind the small glass tube of the thermometer. Such a permanent magnet consists of a flexible non-magnetic binder or the like having a pulverized permanent magnetic material preferably iron-barium-oxide finely dispersed throughout. The magnetic material is magnetized to have north and south poles on the surface toward the thermometer tube.

Another object of the invention is to provide apparatus for adjusting the position of a permanent magnet with respect to a thermometer tube whereby a magnetic field may be selectively applied or removed from a magnetically permeable index or pin of the type described above. In accordance with this object, the thermometer tube is mounted on a scale plate having an aperture therein through which a device for adjusting the magnet or magnets behind the plate may be introduced. To this end, the device for adjusting the magnet may comprise a small pin such as, for example, a match, nail or the like, which may be inserted through the aperture in the scale plate so as to bear against rigid magnets placed flexibly against a base plate, or against the elastic permanent magnets, moving them back long enough to permit the indexes, now freed from the magnetic influence, to drop down onto the tops of the mercury columns. Alternatively, the adjusting device may consist of a pair of angle levers linked to a pair of permanent magnets or their supports and mounted on the back of the scale plate. Each angle lever is provided with a free arm which extends through an aperture in the scale plate, with the free arms being spread apart such that when they are pressed together, the arms carrying the magnets swing outwardly and away from the scale plate to thereby increase the distance between the permanent magnets and the thermometer tube and release the magnetically permeable indexes from the influence of the magnetic field to permit them to drop down onto the mercury columns. Another arrangement for adjusting the permanent magnet or magnets with respect to the thermometer tube employs cam surfaces on which the permanent magnet may slide inwardly or outwardly with respect to the thermometer tube. Finally, it is also possible to connect a pin to the permanent magnet means, with the pin protruding through an aperture in the scale plate. The end of the pin opposite the permanent magnet means is provided with a pushbutton, and a spiral spring is interposed between the pushbutton and the scale plate whereby the permanent magnet is normally biased toward the thermometer tube but may be selectively removed therefrom by depressing the pushbutton.

Still another object of the invention is to provide thermometer indicating means employing one or more permanent magnetic rods of lengths corresponding to the length of the thermometer tube or tubes which have a plurality of north and south poles in side-by-side relationship on one surface such that the magnetic field will pass through a magnetically permeable pin disposed within the thermometer tube. The line between adjacent north and south poles can be in the direction of the axis of the pin or perpendicular to it. Thus, if a plurality of north and south poles alternate along the length of magnetic rods and have a spacing less than the length of the pin, the magnetic field is effectively equal throughout the entire range of adjustability while, with an ordinary bar magnet, charged only bipolarly, this evenly distributed magnetic effect cannot be attained.

The above and other objects and features of the invention will become apparent from the following detailed description taken in connection with the accompanying drawings which form a part of this specification and, in which:

FIGURE 1 is a front view of a maximum-minimum thermometer employing the principles of the present invention;

FIGURE 2 is a cross-sectional view taken along line II—II of FIGURE 1;

FIGURE 3 is a cross-sectional view taken along line III—III of FIGURE 1;

FIGURE 4 is a cross-sectional view similar to FIGURE 3 but illustrating an adjustment which may be employed to move the permanent magnet of the invention outwardly and away from the thermometer tubes of the maximum-minimum thermometer;

Figure 9:
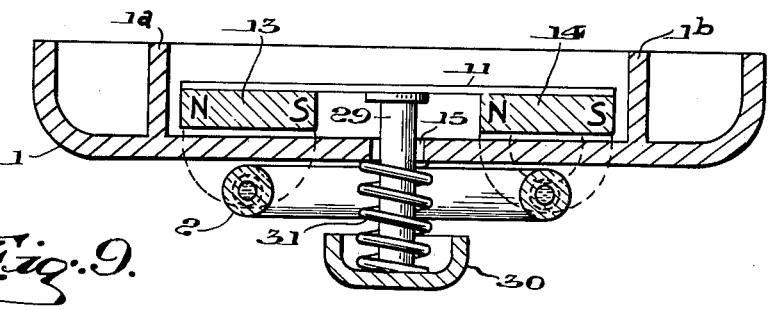
Figure 10:
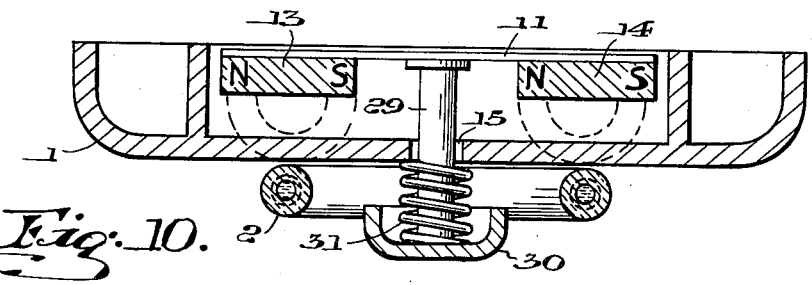
Figure 11:
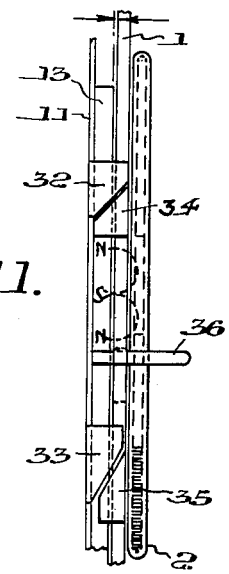
Figure 12:
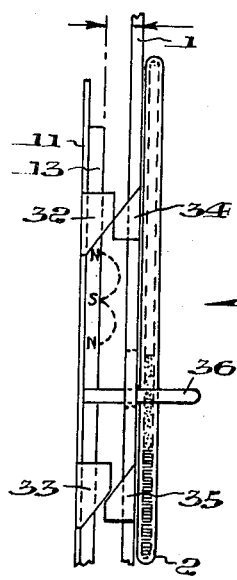

FIGURES 5 and 6, as well as FIGURES 7 and 8, are cross-sectional views of other adjustment possibilities for the permanent magnets; and FIGURES 9 and 10, as well as FIGURES 11 and 12, illustrate two other adjustment arrangements in which the path of the lines of force of the magnets is shown by dotted lines.

Referring now to the drawings which are for the purpose of illustrating an embodiment of the invention, and not for the purpose of limiting the same, FIGURES 1, 2, 3 and 4 illustrate a maximum-minimum thermometer comprising a scale plate 1 having a U-shaped thermometer tube 2 fastened thereto as by means of clamps or holders 3 and 4. Within the two legs 2a and 2b of the thermometer tube 2 are communicating columns of mercury 5 and 6 while above the mercury columns are columns 7 and 8 of a liquid having a high coefficient of expansion, such as alcohol. Above the columns of mercury 5 and 6 and within the alcohol are a pair of magnetically permeable indicating pins or indexes 9 and 10 which are substantially frictionlessly movable (i.e., freely movable) within the legs 2a and 2b. Thus, in the absence of a magnetic field on the pins 9 and 10, they will drop by their own weight onto the tops of the mercury columns 5 and 6, respectively.

It will be noted that the mercury column 6 is higher than mercury column 5. With this arrangement, when the temperature increases, both the alcohol and mercury will expand, thereby forcing the column 6 upwardly while pushing the indicating pin 10 ahead of it. When, however, the temperature falls, both the mercury and alcohol will contract; and since the alcohol has a higher coefficient of expansion than the mercury, the column of alcohol 7 will contract to the point where the mercury column 5 will move upwardly. Thus, the maximum temperature will be indicated by the maximum rise of the mercury column 6; whereas the minimum temperature will be indicated by the maximum rise of the mercury column 5.

Secured to the back of the scale plate 1, as best shown in FIGURES 2, 3 and 4, is a flexible backing plate 11 secured to the scale plate as by means of screws 12a at its opposite ends. The forward surface of the backing plate 11 is provided with gummed foil 12 having a pair of permanent magnet strips 13 and 14 secured thereto. As shown, the permanent magnet strips 13 and 14 are positioned directly behind the legs 2a and 2b of the thermometer tube 2 and are preferably formed from a flexible non-magnetic material or the like having dispersed therein a permanently magnetized pulverized material such as iron-barium-oxide. The backing plate 11 is formed from flexible material and the scale plate 1 is provided with a centrally disposed aperture 15 whereby, as shown in FIGURE 4, a pin 16 may be inserted through the aperture 15 to push the backing plate 11 and the permanent magnets 13 and 14 carried thereby backwardly and away from the thermometer tube 2.

In the operation of the device, the permanent magnets 13 and 14 will normally be positioned closely adjacent the scale plate 1 as shown in FIGURE 3. When the mercury column 6 rises, it will push the indicating pin 10 upwardly; however, when the mercury column 6 recedes or falls, the pin 10 will be held in its uppermost position under the influence of the magnetic field produced by magnet 14, thereby indicating the maximum temperature achieved. Similarly, when the mercury column 5 moves upwardly, it will push the pin 9 ahead of it, and this index will remain in its uppermost position under the influence of the magnetic field produced by the magnet 13. The position of the pin 9 will thus indicate the minimum temperature achieved. After the maximum and minimum temperature readings have been taken for a twenty-four hour period, for example, the pin 16 may be inserted through the aperture 15 to move the flexible backing plate 12 and the magnets 13 and 14 backwardly, thereby releasing the pins 9 and 10 from the effects of the magnetic fields produced by magnets 13 and 14. Thus, the pins 9 and 10, being substantially frictionlessly movable within the legs 2a and 2b, will fall by their own weight onto the tops of the mercury columns 5 and 6 whereby the maximum and minimum temperatures achieved during a succeeding time interval may be recorded by the pins.

FIGURES 5 and 6 illustrate another arrangement for mounting the magnets 13 and 14 and moving them backwardly and away from the thermometer tube 2. In this embodiment, a pair of lever arms 17 and 18 are pivotally connected to the scale plate 1 as at 19 and 20. Lever arm 17 is spring-biased in a clockwise direction and carries the magnet 13; whereas lever arm 18 is spring-biased in a counter-clockwise direction and carries the magnet 14. Each lever arm 17, 18 is provided with an extension 21 or 22, respectively, which protrudes through the aperture 15 in the scale plate 1. Extensions 21 and 22 are formed from spring material and diverge outwardly from each other, the arrangement being such that the extensions 21 and 22 may be pressed together to move the magnets 13 and 14 backwardly as shown in FIGURE 6 to release the indicating elements 9 and 10 from the effects of their associated magnetic fields whereby the elements will drop downwardly by their own weight onto the tops of the mercury columns 5 and 6.

FIGURES 7 and 8 illustrate still another embodiment for adjusting the permanent magnets 13 and 14. In this embodiment the backing plate 11 for the magnets 13 and 14 has a cam 23 secured to its forward face. Cooperatively associated with the cam 23 is a second cam 24 which is securely fastened to a pin or shaft 25 which extends through the aperture 15 in the scale plate 1, as well as an aperture provided in the cam 23 and the backing plate 11. The shaft 25 has a wing nut 26 secured to its forward end and a small disc 27 secured to its other end, the assembly being completed by a coil spring 28 interposed between the disc 27 and the backing plate 11. The cam surfaces on cams 23 and 24 are such that when the wing nut 26 is rotated as shown in FIGURE 8, the backing plate 11 and the magnets 13 and 14 carried thereby will be moved backwardly while compressing the coil spring 28. To return the magnets to their positions closely adjacent the thermometer tube 2, the wing nut 26 is merely rotated in the opposite direction.

Still another embodiment of the invention is shown in FIGURES 9 and 10 wherein a pin 29 projects through the aperture 15 and is secured to the backing plate 11. Secured to the opposite end of the pin 29 is a pushbutton 30. A coil spring 31 is interposed between the pushbutton 30 and the scale plate 1 whereby the spring will normally urge the backing plate and the magnets 13 and 14 against the scale plate to subject the pins 9 and 10 to the magnetic fields produced by the magnets. In order to move the magnets 9 and 10 backwardly away from the scale plate 1 in the embodiments of FIGURES 9 and 10, the pushbutton 30 is merely depressed, thereby compressing the spring 31 while moving the backing plate 11 backwardly. In this embodiment, the guide bars 1a and 1b on the scale plate 1 prevent tilting of the backing plate 11 and the magnets 13 and 14.

It will be noted in FIGURES 9 and 10 that when the magnets 13 and 14 are pressed against the back of scale plate 1 by spring 31, the lines of force proceeding from the north and south poles of the magnets almost completely penetrate the indicating pins 9 and 10 to hold them in their uppermost positions. When pushbutton 30 is depressed, however, the magnets 13 and 14 are temporarily moved backwardly from the scale plate 1 and the thermometer tube 2 so that the indicating pins 9 and 10 are removed from the range of the lines of force. The indicating pins 9 and 10 can thus drop downwardly under their own weight onto the tops of the mercury columns 5 and 6.

In FIGURES 11 and 12 an embodiment of the invention is shown wherein the backing plate 11 is provided with a pair of inclined cams 32 and 33 which cooperate with similar cams 34 and 35 on the scale plate 1. A pin 36 projects through a slot in the scale plate 1 and is secured to the backing plate 11 whereby the backing plate may be moved downwardly to position the permanent magnets 13 and 14 downwardly and away from the scale plate 1 as shown in FIGURE 12. Suitable spring means, not shown, may be provided to normally urge the backing plate 11 and the magnets carried thereby into the position shown in FIG. 11 wherein the magnets are closely adjacent the thermometer tube 2. It will be seen from FIGS. 11 and 12 that when the permanent magnets comprise a mixture of a flexible thermoplastic material, e.g. rubber or polyvinyl and a finely dispersed permanent magnetic material such as barium-iron-oxide, the magnets may be magnetized to have either north and south poles on their opposite edges as shown in FIGS. 9 and 10 or north and south poles alternating along the length of the magnet as shown in FIGS. 11 and 12 and spaced a distance less than the length of the pin 10. Thus, the magnetic field is substantially equal throughout the entire length and width of the magnet.

Although the invention has been shown in connection with certain specific embodiments, it will be readily apparent to those skilled in the art that various changes in form and arrangement of parts may be made to suit requirements without departing from the spirit and scope of the invention.

Having thus described my invention, I claim:

1. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, and permanent magnet means extending throughout the length of said tube for attracting said element and holding it in any position above the liquid column.

2. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, and permanent magnet means normally extending longitudinally of said tube to attract said element into frictional engagement with the inside wall of said tube to hold the magnetically permeable element in the position to which it is moved at the maximum height of said liquid said means being movable away from the tube to permit the element to drop by its own weight onto the top of the column of expansible liquid.

3. In a maximum-minimum thermometer of the type having a generally U-shaped transparent tube containing in each of its legs columns of liquid which expand and contract in response to temperature variations, means for indicating the maximum height of the columns of liquid in the respective legs comprising a ferromagnetic indicating element substantially frictionlessly movable within each of said legs, and permanent magnet means normally positioned closely adjacent said legs to attract and hold the ferromagnetic elements in any position to which they are moved at the maximum height of the respective columns of liquid, said means being movable away from the tube to permit the ferromagnetic elements to drop by their own weight onto the tops of the columns of expansible liquid.

4. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, a backing member on which the transparent tube is mounted, a strip of flexible plastic material embedded with permanently magnetic iron-barium-oxide with the flexible strip being secured at its opposite ends to said backing plate adjacent the tube and adapted to attract and hold the magnetically permeable element in any position to which it is moved at the maximum height of said liquid, and means for moving at least the median portion of the strip outwardly and away from the tube to permit the magnetically permeable element to drop by its own weight onto the top of the column of expansible liquid.

5. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, a backing member on which the transparent tube is mounted, a permanent magnetic member mounted on said backing plate and normally positioned adjacent said tube whereby the magnetic member will attract and hold the magnetically permeable element in any position to which it is moved at the maximum height of said liquid, and means on the backing plate for moving the magnetic member outwardly and away from said tube to permit the magnetically permeable element to drop by its own weight onto the top of the column of expansible liquid.

6. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, a backing member on which the transparent tube is mounted, a permanent magnetic member mounted on the side of said backing plate opposite said transparent tube and normally positioned adjacent said opposite side whereby the magnetic member will hold the magnetically permeable element in the position to which it is moved at the maximum height of said liquid, and means for moving the magnetic member outwardly and away from the backing plate to permit the magnetically permeable element to drop by its own weight onto the top of the column of expansible liquid, said latter-mentioned means comprising an aperture in the backing plate, a pin extending through said aperture and having one end connected to said magnetic member, an actuating pushbutton secured to the other end of said pin, and resilient spring means interposed between the backing member and said actuating pushbutton whereby the spring means will normally urge the magnetic member into engagement with said backing plate.

7. The combination claimed in claim 6 wherein said latter-mentioned means for moving the magnetic member outwardly and away from the tube comprises an aperture in the backing plate, a rotatable shaft extending through said aperture, cam means on the magnetic member, cooperating cam means on the rotatable shaft, cam surfaces on the respective cam means which will cause said magnetic member to move outwardly and away from said backing plate upon rotation of said shaft, and spring means normally urging said magnetic member toward said backing plate.

8. The combination claimed in claim 6 wherein said latter-mentioned means for moving the magnetic member outwardly and away from said tube comprises inclined surfaces on the side of said backing plate adjacent said magnetic member, cooperating inclined surfaces on the magnetic member with the inclined surfaces on the magnetic member being adapted to slide on the inclined surfaces on said backing plate, and means for moving the magnetic member on said inclined surfaces whereby the magnetic member may be moved away from or toward the backing plate.

9. In a maximum-minimum thermometer of the type having a generally U-shaped transparent tube containing columns of liquid in its respective legs which expand and contract in response to temperature variations, means for indicating the maximum height of the respective columns of liquid comprising ferromagnetic indicating elements substantially frictionlessly movable within said legs, a backing member on which the U-shaped tube is mounted, an aperture in the backing member, a pair of levers pivotally connected to the side of said backing plate opposite said U-shaped tube with each lever being positioned behind a respective leg of the U-shaped tube and pivoted about an axis extending parallel to this respective leg, said levers being spring-biased against the backing plate, a pair of strips of flexible plastic material embedded with permanently magnetic iron-barium-oxide secured to said levers, and an arm on each of said levers extending through said aperture, said arms being formed from spring material and being shaped whereby they diverge away from each other after passing through said aperture, the arrangement being such that when the arms are moved together the levers will be forced to pivot about said axes and move the strips of flexible plastic material outwardly and away from the backing plate.

10. In a thermometer of the type having a generally vertical transparent tube containing a column of liquid which expands and contracts in response to temperature variations, a scale plate on which said transparent tube is mounted, a device for indicating the maximum height of the column of liquid within said tube comprising a magnetically permeable indicating element substantially frictionlessly movable within said tube, a flexible backing plate secured at its opposite ends at the side of said scale plate opposite the transparent tube with the flexible backing plate extending along the length of the transparent tube, and permanent magnet means secured to the side of said flexible backing plate facing the scale plate, the arrangement being such that the flexible backing plate will normally urge the permanent magnet means against the scale plate to hold the magnetically permeable element in the position to which it is moved at the maximum height of said liquid, and means for moving the flexible backing plate and the permanent magnet means carried thereby outwardly and away from the scale plate to permit the magnetically permeable element to drop by its own weight onto the top of the column of expansible liquid.

11. The combination claimed in claim 10 wherein the permanent magnet means comprises a strip of flexible plastic material embedded with permanently magnetic iron-barium-oxide.

12. In a thermometer of the type having a generally vertical transparent tube containing a column of liquid which expands and contracts in response to temperature variations, means for indicating the maximum height of the column of liquid comprising a magnetically permeable indicating element substantially frictionlessly movable within said tube, and permanent magnet means extending along the length of the tube for attracting said element and holding it in any position above the liquid column, said permanent magnet means comprising an elongated strip of plastic material having pulverized permanent magnetic material embedded therein, said strip having a plurality of magnetic poles of alternate polarity closely spaced along its length.

References Cited in the file of this patent

UNITED STATES PATENTS

| | | |
|---|---|---|
| 2,102,678 | Campbell | Dec. 21, 1937 |
| 2,285,440 | Kaiser | June 9, 1942 |
| 2,411,425 | Hagner | Nov. 19, 1946 |
| 2,533,348 | Brandenburg | Dec. 12, 1950 |
| 2,869,047 | Smit et al. | Jan. 13, 1959 |
| 2,930,234 | Haroda | Mar. 29, 1960 |
| 2,932,545 | Foley | Apr. 12, 1960 |